US011979232B2

United States Patent
De et al.

(10) Patent No.: US 11,979,232 B2
(45) Date of Patent: May 7, 2024

(54) VERIFICATION OF ETHERNET HARDWARE BASED ON CHECKSUM CORRECTION WITH CYCLIC REDUNDANCY CHECK

(71) Applicant: Synopsys, Inc., Mountain View, CA (US)

(72) Inventors: Jishnu De, Noida (IN); Jaspreet Singh Gambhir, Delhi (IN)

(73) Assignee: Synopsys, Inc., Mountain View, CA (US)

( * ) Notice: Subject to any disclaimer, the term of this patent is extended or adjusted under 35 U.S.C. 154(b) by 67 days.

(21) Appl. No.: 17/943,712

(22) Filed: Sep. 13, 2022

(65) Prior Publication Data

US 2023/0086197 A1   Mar. 23, 2023

Related U.S. Application Data

(60) Provisional application No. 63/245,748, filed on Sep. 17, 2021.

(51) Int. Cl.
*H04L 1/00* (2006.01)
*H04L 1/24* (2006.01)
*H04L 43/106* (2022.01)

(52) U.S. Cl.
CPC ............ *H04L 1/0061* (2013.01); *H04L 1/24* (2013.01); *H04L 43/106* (2013.01)

(58) Field of Classification Search
CPC ....... H04L 1/0045; H04L 1/0061; H04L 1/24; H04L 43/106
See application file for complete search history.

(56) References Cited

U.S. PATENT DOCUMENTS

| 7,243,289 B1 * | 7/2007 | Madhusudhana ... H03M 13/091 714/776 |
| 7,561,559 B2 * | 7/2009 | Hannel ................. H04L 43/087 370/503 |
| 9,639,416 B1 * | 5/2017 | Parlour ............... H03M 13/091 |

(Continued)

OTHER PUBLICATIONS

A. S. Shahsad., K. V. Purushothaman and S. V. MurugaPrasad, "Error free high speed data transmission for IPV6 packets," 2013 International Conference on Circuits, Power and Computing Technologies (ICCPCT), Nagercoil, India, 2013, pp. 993-996, doi: 10.1109/ICCPCT.2013.6528894. (Year: 2013).*

*Primary Examiner* — Shelly A Chase
*Assistant Examiner* — Enamul M Kabir
(74) *Attorney, Agent, or Firm* — Fenwick & West LLP

(57) ABSTRACT

A system performs verification of Ethernet hardware. A data frame including a first portion for storing a checksum value and a second portion for storing a timestamp value is received. The second portion of data frame is set to zero. A timestamp value for including in second portion of the data frame is received. A modified checksum value is determined based on the checksum value included in the first portion of the data frame and the timestamp value. A cyclic redundancy check (CRC) value is determined for the data frame by nullifying the checksum value in the data frame and considering the timestamp value. A final CRC value is determined by combining the CRC value for the data frame and a CRC correction value based on the checksum. The modified data frame is sent for processing using an emulator.

20 Claims, 13 Drawing Sheets

(56) References Cited

U.S. PATENT DOCUMENTS

| | | | |
|---|---|---|---|
| 10,587,491 B1 * | 3/2020 | Volpe | H04L 43/18 |
| 2004/0264434 A1 * | 12/2004 | Weissberger | H04L 47/283 |
| | | | 370/503 |
| 2012/0311411 A1 * | 12/2012 | Kirkpatrick | G06F 11/1004 |
| | | | 714/E11.032 |
| 2016/0337083 A1 * | 11/2016 | Englert | H04L 1/0061 |

* cited by examiner

VERIFICATION OF ETHERNET HARDWARE BASED ON CHECKSUM CORRECTION WITH CYCLIC REDUNDANCY CHECK

CROSS REFERENCE TO RELATED APPLICATIONS

This application claims a benefit of U.S. Patent Application Ser. No. 63/245,748, filed Sep. 17, 2021, the contents of which are incorporated by reference herein in its entirety.

TECHNICAL FIELD

The present disclosure relates to verification of circuits in general and more specifically to verification of Ethernet hardware using checksum correction with cyclic redundancy check (CRC).

BACKGROUND

Ethernet is used for connecting devices via a protocol in a wired local area network (LAN) or wide area network (WAN). Ethernet port designs support high speeds ranging from 10 megabits per second (Mbps) to 800 Gbps (gigabits per second). Verification of Ethernet hardware is performed for correctness verification as well as performance verification. Correctness verification ensures that a packet is transmitted and received correctly whereas performance verification ensures that the end-to-end transmission delay is within the specification limits. The verification process verifies that a packet is transmitted and received correctly, and the transmission delay of the packet is within the specification limits. Such performance verification is performed using transactors that include a hardware component and a software component. A transactor converts the data between high-level commands of the software component in a host verification environment by performing protocol-specific actions to match the specific protocol interface at the hardware component of the emulated hardware. Transactors need to comply to the needs of high performance in the emulator to enable processing large number of packets in less time.

SUMMARY

A system performs verification of Ethernet hardware. A data frame is received. The data frame includes a first portion for storing a checksum value and a second portion for storing a timestamp value. The second portion of data frame is set to zero. A timestamp value for including in second portion of the data frame is received. A modified checksum value is determined based on the checksum value included in the first portion of the data frame and the timestamp value. A cyclic redundancy check (CRC) value is determined for the data frame by nullifying the checksum value in the data frame and considering the timestamp value. A final CRC value is determined by combining the CRC value for the data frame and a CRC correction value based on the checksum. The modified data frame including the modified checksum value and the final CRC value is sent for processing using an emulator.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
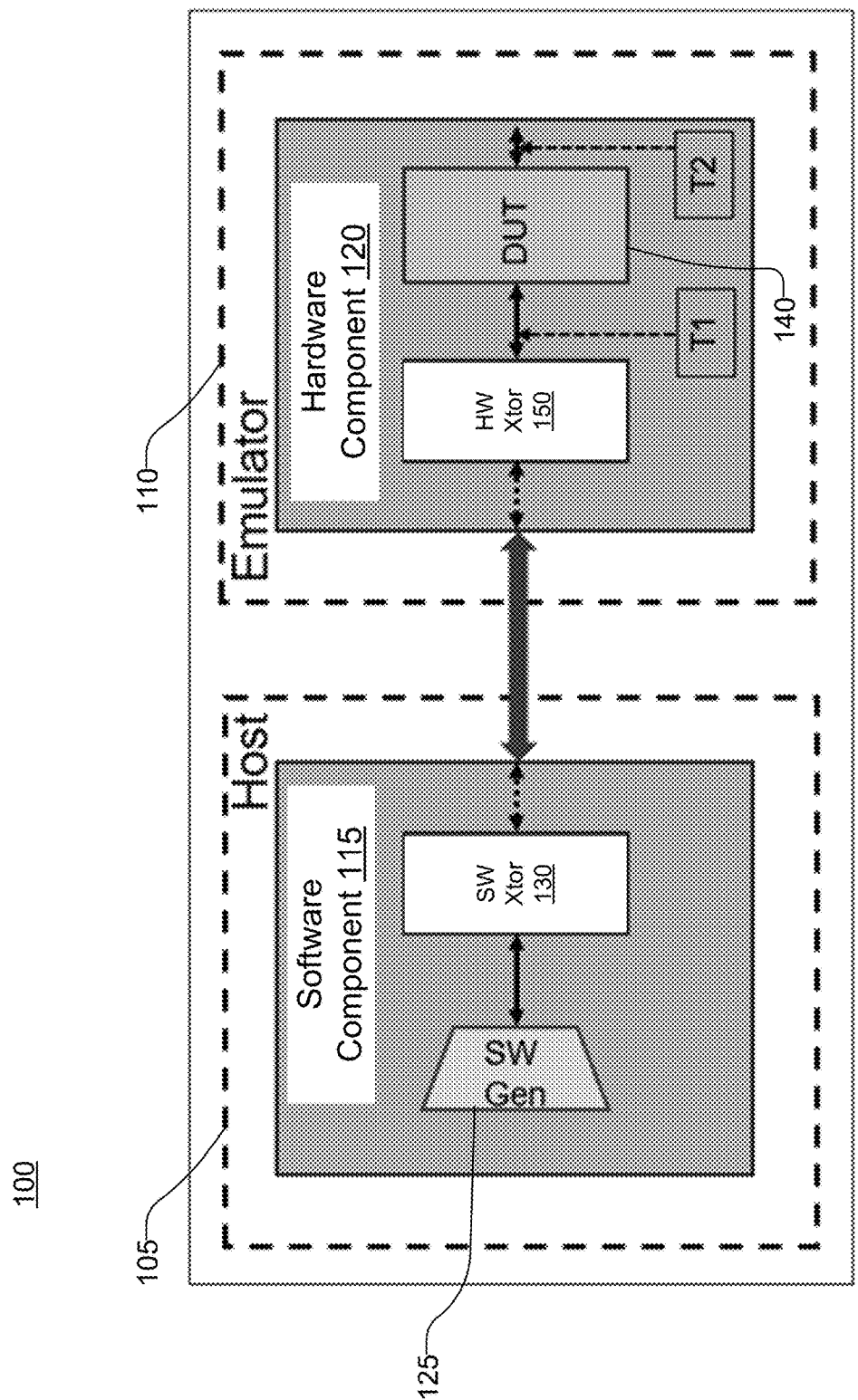
FIG. 1 shows a system environment for performing verification of Ethernet performance, according to an embodiment.

A system performs performance verification of chips including Ethernet ports. For performance analysis, the system has to analyze a large number of data frames that may be transmitted using Ethernet. A data frame may also be referred to as an Ethernet packet or an Ethernet frame. The size of the chip and number of packets analyzed makes performance verification a highly computation intensive operation. The system determines packet delays using an emulator.

The system measures packet delays as follows. The system adds a timestamp to a data frame. The system measures the packet delay by comparing the timestamp added to the packet with a second timestamp determined after any processing that may be performed by the design under test (DUT). The data frame includes a checksum and a cyclic redundancy check (CRC) value determined based on the data of the data frame. The CRC is an error-detecting code used to detect accidental changes to the data being transmitted. A CRC is based on division of polynomials over a Galois Field of two elements referred to as GF(2). The receiver of the data frame recomputes the CRC value based on the data of the data frame independently and compares with the CRC value. If the two CRC values fail to match the receiver of the data frame determines that there was change in data of the data frame during transmission.

Modifying the data frame by adding the timestamp value modifies the checksum value and the CRC value. Recalculating the checksum value and the CRC value after adding the timestamp causes delay in the verification process. The system determines the checksum and the CRC values efficiently as follows. The system receives a data frame including a checksum value at a particular position. The system determines the timestamp for including in the data frame. The system determines a modified checksum value based on the checksum value obtained from the data frame and the received timestamp value. The system determines a CRC value for the data frame by nullifying the checksum value, i.e., by making all bits of that portion zeros. The system determines a CRC correction value for the data frame based on the modified checksum value. The system determines a final CRC value by combining the CRC value with the CRC correction value. The system sends a modified data frame including the modified checksum value and the final CRC value.

The determination of the corrected checksum and final CRC value is an efficient operation and can be performed in a single hardware clock cycle. Furthermore, the process reuses any given framework for CRC evaluation with minimal modifications. Accordingly, the system efficiently utilizes the memory and bandwidth of the hardware. This allows efficient performance verification of large chips. Furthermore, the techniques disclosed add minimal logic to the existing CRC evaluators. The only additional logic that is added for CRC correction are: 16-bit parallel data XOR evaluator, a CRC transform evaluator, and a conditional bit wise XOR of the calculated CRC. Since the correction logic is small, the checksum and CRC correction is possible in a single clock cycle. This helps in maintaining the good performance with minimal area usage. Furthermore, by splitting the checksum re-evaluation into 2 parts of SW and HW, the system does not need additional memory to store frames to get full frame visibility in HW and also is able to fully utilize HW bandwidth. By making the checksum location available to the HW as a field, the system eliminates the need for the hardware to determine the location from the frame based on complicated frame parsers. This saves area and performance.

FIG. 1 shows a system environment for performing verification of Ethernet performance, according to an embodiment. The overall system environment 100 includes a host device 105 including a software (SW or S/W) component 115 and an emulator device 110 including a hardware (HW or H/W) component 120. Transactors (Xtor) are used for testing chips for runtime performance in addition to verification of correctness. The transactor 150 receives data from the software component 115 and provides it to the DUT 140. The DUT may be an Ethernet switch with multiple ports.

A software traffic generator 125 of the software component 115 feeds packet traffic to the DUT 140 in the emulator 110. The Ethernet transactor acts as a bridge between the software component 115 and the hardware component 120. The transactor includes a software (SW) transactor 130 and the hardware (HW) transactor 150. The SW transactor generates data and send to the HW transactor. The HW transactor 150 timestamps the packets to measure the packet delay in the DUT's input that is received from the transactor and the DUT's output provided to an application layer.

The transactor uses a shared clock (CT) between the transactor and DUT. The emulator determines the length of time spent by the data frame within the DUT as follows. When the first byte of the frame is being sent on the network, the transactor determines the current time (T1) and replaces the last 8 bytes of the data frame with the value T1. When the DUT's application output receives the first byte of the frame, the current time (T2) is recorded. The latency is determined based on the difference between T2 and T1, i.e., T2-T1. Accordingly, T1 is subtracted from the last 8 bytes of the frame that store the value of T1. This may be converted to units of time by multiplying (T2-T1) with the time-period of CT.

Figure 2A:
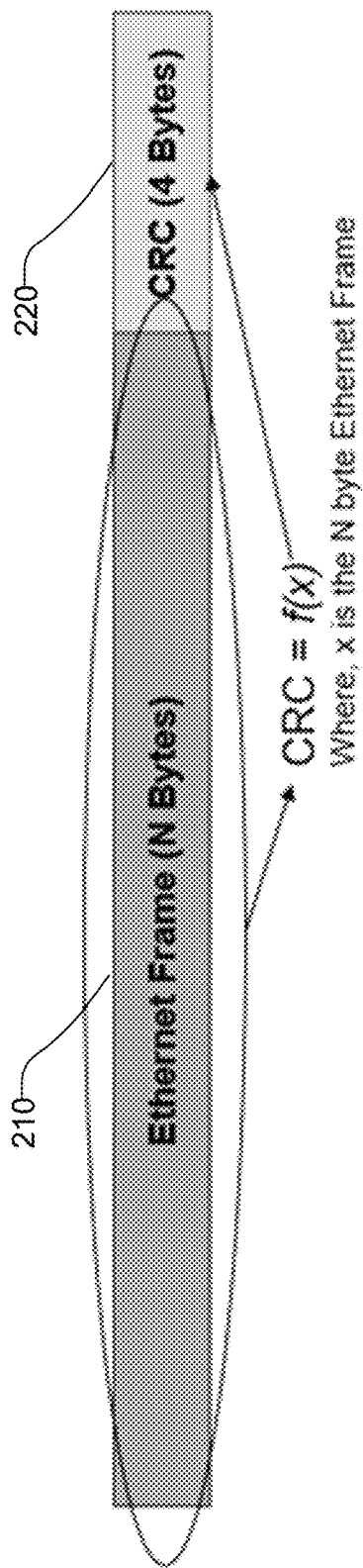
FIG. 2A shows a diagrammatic representation an Ethernet frame, according to an embodiment.

FIG. 2A shows a diagrammatic representation of an Ethernet frame, according to an embodiment. Ethernet frames based on transmission control protocol (TCP) and user datagram protocol (UDP) have a checksum field in the header that is calculated over the entire frame 210. The checksum field has a predetermined length, for example, 16-bits. Depending on the type of frame, the location of the checksum within the frame may vary. As shown in FIG. 2A, a CRC value is determined based on the N number of bytes of Ethernet frame data. According to an embodiment, the CRC value 220 is represented using two bytes appended at the end of the Ethernet frame.

Figure 2B:
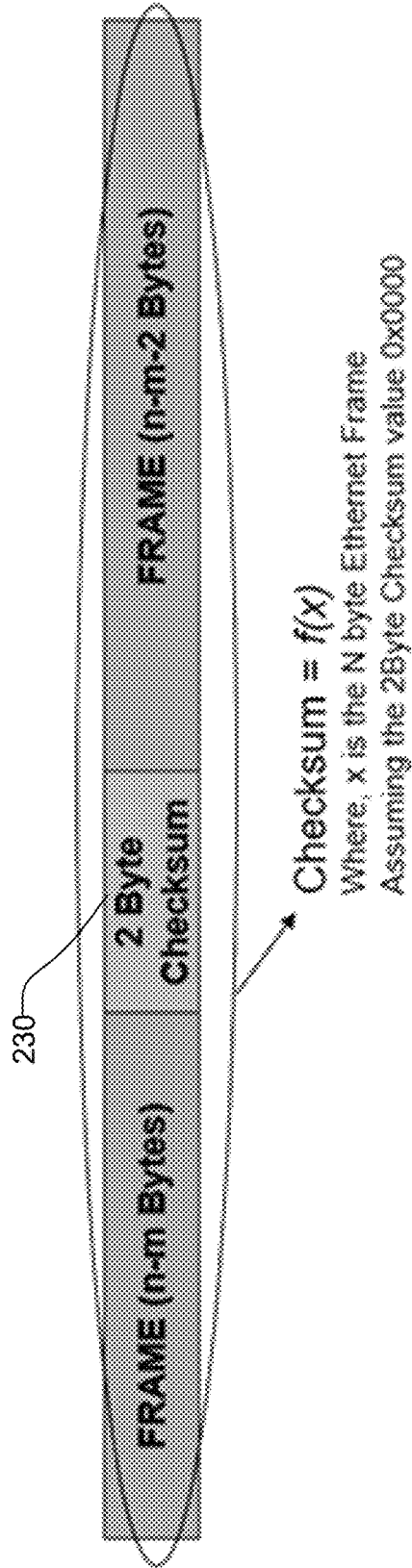
FIG. 2B shows a diagrammatic representation of checksum calculation over Ethernet frame, according to an embodiment.

FIG. 2B shows a diagrammatic representation of the Ethernet frame including a timestamp value, according to an embodiment. When a frame is transmitted, the system captures the timestamp indicating the time when the first bytes of the frame is transmitted. The transactor changes the last 8 bytes of the frame by replacing it with the timestamp data from the transactor. Since the data of the data frame is changed as a result of inserting the timestamp data in the data frame, the system recalculates and corrects the 16-bit checksum field in the frame. For example, an Ethernet frame that carries layer 3 (L3)/layer 4 (L4) of open systems interconnections (OSI) headers has a checksum field 230 within the frame. Since the CRC is evaluated over the entire frame, correction to the checksum field 230 results in a corresponding correction to CRC.

The checksum re-calculation is challenging for the following reasons. The hardware transactor receives data at a particular transmission rate, for example, 128 bytes (1024-bits) in a single clock cycle with a frame being transmitted over multiple clocks. The checksum field 230 may be present in the middle of the frame, for example, within a threshold distance of the middle of the frame, such that the distance is measured in terms of number of bytes. The transactor needs to recalculate the checksum based on the timestamp data and needs to correct and append the new checksum at the same clock it is received. However, if the frame does not end in the same clock that checksum is received, the checksum calculation cannot be performed as the checksum is calculated over the full frame.

Once the checksum is corrected, the change in checksum also requires CRC correction. A CRC evaluator (as described below with respect to FIG. 4) calculates the CRC value. The CRC evaluator needs to process the incoming frame byte by byte. With 128 bytes being fed in 1 clock cycle, the CRC evaluator is more complex and therefore requires at least 2 clock cycles to evaluate CRC.

The system, according to various embodiments, achieves timestamping with checksum and CRC re-calculation and is implemented over a 1024-bit bus and uses the same clock that is clocking the 1024-bit data bus, without requiring another faster clock. The combinatorial logic added is less than the longest combinatorial logic present in the system. As a result no overhead is added and the logical circuit footprint added is small.

The frame check sequence (FCS) is the 32-bit CRC value that encapsulates an Ethernet frame. The CRC value is computed as a function of the contents of the protected fields of the medium access control (MAC) frame: the destination address, source address, length/type field, MAC client data, and pad (that is, all fields except FCS). The encoding is defined by the following equation representing 32 bit CRC evaluator G(x) representing a 32 degree polynomial based on a variable x.

$$G(x)=x^{32}+x^{26}+x^{23}+x^{22}+x^{16}+x^{12}+x^{10}+x^8+x^7+x^5+x^4+x^2+x+1 \quad \text{(Equation 1)}$$

CRC-32 computation for the 1024-bit data path is implemented using a parallel cyclic redundancy check (CRC) method. In this method, a circuit calculates the CRC for an 'n'-bit parallel data input based on the current pre-loaded value in the CRC register.

For example, the CRC-32 equation for an 8-bit input is as follows.

$CRC[0]=D[1]\hat{}D[7]\hat{}C[30]\hat{}C[24]\ CRC[1]=D[0]\hat{}D[1]\hat{}D[6]\hat{}D[7]\hat{}C[31]\hat{}C[30]\hat{}C[25]\hat{}C[24]\ CRC[2]=D[0]\hat{}D[1]\hat{}D[5]\hat{}D[6]\hat{}D[7]\hat{}C[31]\hat{}C[30]\hat{}C[26]\hat{}C[25]\hat{}C[24]CRC[3]=D[0]\hat{}D[4]\hat{}D[5]\hat{}D[6]\hat{}C[31]\hat{}C[27]\hat{}C[26]\hat{}C[25]\ CRC[4]=D[1]\hat{}D[3]\hat{}D[4]\hat{}D[5]\hat{}D[7]\hat{}C[30]\hat{}C[28]\hat{}C[27]\hat{}C[26]\hat{}C[24]\ CRC[5]=D[0]\hat{}D[1]\hat{}D[2]\hat{}D[3]\hat{}D[4]\hat{}D[6]\hat{}D[7]\hat{}C[31]\hat{}C[30]\hat{}C[29]\hat{}C[28]\hat{}C[27]\hat{}C[25]\hat{}C[24]\ CRC[6]=D[0]\hat{}D[1]\hat{}D[2]\hat{}D[3]\hat{}D[5]\hat{}D[6]\hat{}C[31]\hat{}C[30]\hat{}C[29]\hat{}C[28]\hat{}C[26]\hat{}C[25]\ CRC[7]=D[0]\hat{}D[2]\hat{}D[4]\hat{}D[5]\hat{}D[7]\hat{}C[31]\hat{}C[29]\hat{}C[27]\hat{}C[26]\hat{}C[24]\ CRC[8]=D[3]\hat{}D[4]\hat{}D[6]\hat{}D[7]\hat{}C[28]\hat{}C[27]\hat{}C[25]\hat{}C[24]\ CRC[9]=D[2]\hat{}D[3]\hat{}D[5]\hat{}D[6]\hat{}C[29]\hat{}C[28]\hat{}C[26]\hat{}C[25]\ CRC[10]=D[2]\hat{}D[4]\hat{}D[5]\hat{}D[7]\hat{}C[29]\hat{}C[27]\hat{}C[26]\hat{}C[24]\ CRC[11]=D[3]\hat{}D[4]\hat{}D[6]\hat{}D[7]\hat{}C[28]\hat{}C[27]\hat{}C[25]\hat{}C[24]\ CRC[12]=D[1]\hat{}D[2]\hat{}D[3]\hat{}D[5]\hat{}D[6]\hat{}D[7]\hat{}C[30]\hat{}C[29]\hat{}C[28]\hat{}C[26]\hat{}C[25]\hat{}C[24]\ CRC[13]=D[0]\hat{}D[1]\hat{}D[2]\hat{}D[4]\hat{}D[5]\hat{}D[6]\hat{}C[31]\hat{}C[30]\hat{}C[29]\hat{}C[27]\hat{}C[26]\hat{}C[25]\ CRC[14]=D[0]\hat{}D[1]\hat{}D[3]\hat{}D[4]\hat{}D[5]\hat{}C[31]\hat{}C[30]\hat{}C[28]\hat{}C[27]\hat{}C[26]\ CRC[15]=D[0]\hat{}D[2]\hat{}D[3]\hat{}D[4]\hat{}C[31]\hat{}C[29]\hat{}C[28]\hat{}C[27]\ CRC[16]=D[2]\hat{}D[3]\hat{}D[7]\hat{}C[29]\hat{}C[28]\hat{}C[24]\ CRC[17]=D[1]\hat{}D[2]\hat{}D[6]\hat{}C[30]\hat{}C[29]\hat{}C[25]\ CRC[18]=D[0]\hat{}D[1]\hat{}D[5]\hat{}C[31]\hat{}C[30]\hat{}C[26]\ CRC[19]=D[0]\hat{}D[4]\hat{}C[31]\hat{}C[27]\ CRC[20]=D[3]\hat{}C[28]\ CRC[21]=D[2]\hat{}C[29]\ CRC[22]=D[7]\hat{}C[24]\ CRC[23]=D[1]\hat{}D[6]\hat{}D[7]\hat{}C[30]\hat{}C[25]\hat{}C[24]\ CRC[24]=D[0]\hat{}D[5]\hat{}D[6]\hat{}C[31]\hat{}C[26]\hat{}C[25]\ CRC[25]=D[4]\hat{}D[5]\hat{}C[27]\hat{}C[26]\ CRC[26]=D[1]\hat{}D[3]\hat{}D[4]\hat{}D[7]\hat{}C[30]\hat{}C[28]\hat{}C[27]\hat{}C[24]\ CRC[27]=D[0]\hat{}D[2]\hat{}D[3]\hat{}D[6]\hat{}C[31]\hat{}C[29]\hat{}C[28]\hat{}C[25]\ CRC[28]=D[1]\hat{}D[2]\hat{}D[5]\hat{}C[30]\hat{}C[29]\hat{}C[26]\ CRC[29]=D[0]\hat{}D[1]\hat{}D[4]\hat{}C[31]\hat{}C[30]\hat{}C[27]\ CRC[30]=D[0]\hat{}D[3]\hat{}C[31]\hat{}C[28]\ CRC[31]=D[2]\hat{}C[29]$ (Equation 2)

where CRC refers to the 32-bit CRC output, D represents the 8-bit data input, and C represents a preloaded CRC register, initialized to 32'hff_ff_ff_ff. With the above 8-bit parallel evaluator, a daisy chained N-byte CRC evaluator is implemented. The preloaded CRC register value for node 'n' is the output CRC of node 'n−1' (where 0<=n<N). The first node in the chain is preloaded with CRC value 32'hff_ff_ff_ff_ff.

Figure 3:
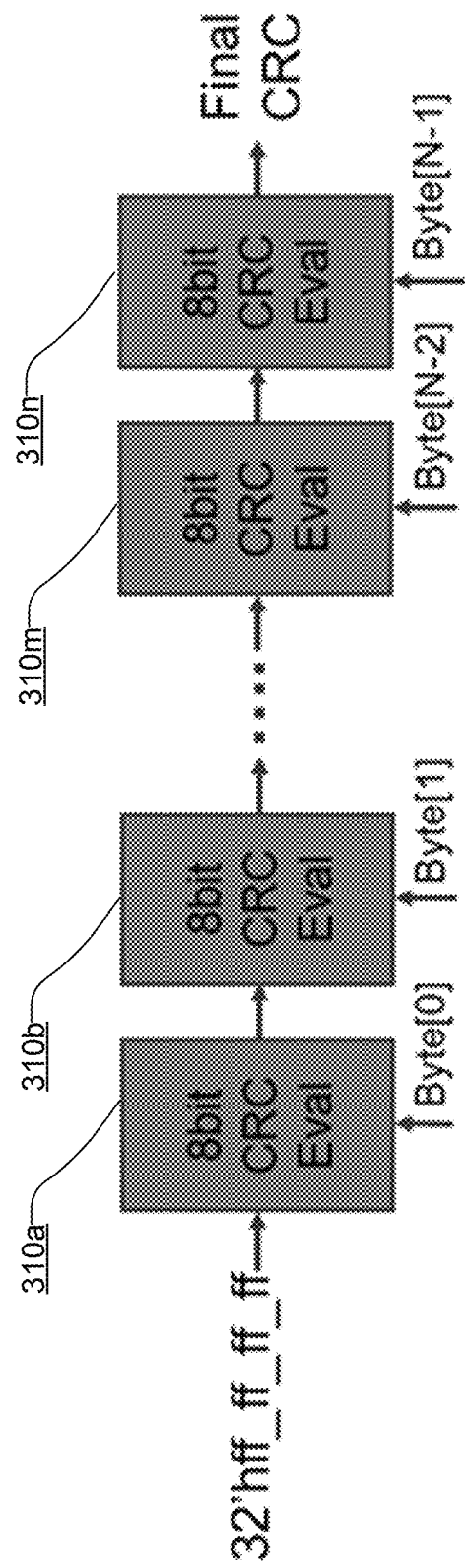
FIG. 3 shows a daisy chained CRC evaluator, according to an embodiment.

FIG. 3 shows a daisy chained CRC evaluator, according to an embodiment. As shown, the overall CRC evaluator is composed of smaller unit CRC evaluators 310a, 310b, . . . , 310m, 310n. Each unit CRC evaluator processes M bits. If an N bit data is received, the input data is divided into N/M units of M bit data. For example, as shown in FIG. 3, N=32 and M=8. The N bit input data is divided into N/M chunks of M bits each. In this example, the 32 bit input data is divided into 4 chunks of 8 bits each.

The M-bit chunks are processed as follows. The first unit CRC evaluator 310 (e.g., 310a) processes the first M bit chunk to generate a partial CRC result. The initial value of the partial CRC results provided as input to the first unit CRC evaluator is all binary is or equivalently all hexadecimal Fs. The partial CRC result is provided as input to the next unit CRC evaluator (e.g., 310b) along with the next M-bit chunk of the data. The next unit CRC evaluator determines the next partial CRC result based on the received CRC partial result input and the corresponding M-bit chunk. This process is repeated until all M-bit chunks of input data are processed.

Accordingly, a series of unit CRC evaluators are connected to form a daisy chain, each unit CRC evaluator receiving a partial CRC result from the previous unit CRC evaluator and an M-bit chunk of the input data and generates the next CRC partial result that is provided as input to the next unit CRC evaluator in the daisy chain. The system may use the same CRC evaluator and store the partial CRC results in sequential circuits and keep feeding the partial results as the output of the sequential circuit back to the CRC evaluator along with an M-bit chunk of the input. Accordingly, the CRC evaluation is divided into logical fragments to reduce the combinatorial path.

As with 8-bit parallel evaluators, corresponding equations are used for parallel evaluators for 8-bit, 16-bit, 24-bit, 32-bit, 40-bit, 48-bit, 56-bit, 64-bit, 128-bit, 192-bit, 256-bit, 320-bit, 384-bit, 448-bit, 512-bit, 576-bit, 640-bit, 704-bit, 768-bit, 832-bit, 896-bit, 960-bit and 1024-bit data. While creating parallel evaluators, equations are reduced via Boolean simplification from their corresponding daisy chained versions.

For higher bit width evaluators, the equations are long which result in long combinational paths. So, all evaluators are divided into two parts. The first part evaluates the data XORs and the second part received the data XOR output and evaluates CRC with the preloaded CRC register. For example, equation 2 for 8-bit CRC evaluator is represented as following equation 3.

$DX[31]=D[1]\hat{}D[7]\ DX[30]=D[0]\hat{}D[1]\hat{}D[6]\hat{}D[7]\ DX[29]=D[0]\hat{}D[1]\hat{}D[5]\hat{}D[6]\hat{}D[7]\ DX[28]=D[0]\hat{}D[4]\hat{}D[5]\hat{}D[6]\ DX[27]=D[1]\hat{}D[3]\hat{}D[4]\hat{}D[5]\hat{}D[7]\ DX[26]=D[0]\hat{}D[1]\hat{}D[2]\hat{}D[3]\hat{}D[4]\hat{}D[6]\hat{}D[7]\ DX[25]=D[0]\hat{}D[1]\hat{}D[2]\hat{}D[3]\hat{}D[5]\hat{}D[6]\ DX[24]=D[0]\hat{}D[2]\hat{}D[4]\hat{}D[5]\hat{}D[7]\ DX[23]=D[3]\hat{}D[4]\hat{}D[6]\hat{}D[7]\ DX[22]=D[2]\hat{}D[3]\hat{}D[5]\hat{}D[6]\ DX[21]=D[2]\hat{}D[4]\hat{}D[5]\hat{}D[7]\ DX[20]=D[3]\hat{}D[4]\hat{}D[6]\hat{}D[7]\ DX[19]=D[1]\hat{}D[2]\hat{}D[3]\hat{}D[5]\hat{}D[6]\hat{}D[7]\ DX[18]=D[0]\hat{}D[1]\hat{}D[2]\hat{}D[4]\hat{}D[5]\hat{}D[6]\ DX[17]=D[0]\hat{}D[1]\hat{}D[3]\hat{}D[4]\hat{}D[5]\ DX[16]=D[0]\hat{}D[2]\hat{}D[3]\hat{}D[4]\ DX[15]=D[2]\hat{}D[3]\hat{}D[7]\ DX[14]=D[1]\hat{}D[2]\hat{}D[6]\ DX[13]=D[0]\hat{}D[1]\hat{}D[5]\ DX[12]=D[0]\hat{}D[4]\ DX[11]=D[3]\ DX[10]=D[2]\ DX[9]=D[7]\ DX[8]=D[1]\hat{}D[6]\hat{}D[7]\ DX[7]=D[0]\hat{}D[5]\hat{}D[6]\ DX[6]=D[4]\hat{}D[5]\ DX[5]=D[1]\hat{}D[3]\hat{}D[4]\hat{}D[7]\ DX[4]=D[0]\hat{}D[2]\hat{}D[3]\hat{}D[6]\ DX[3]=D[1]\hat{}D[2]\hat{}D[5]\ DX[2]=D[0]\hat{}D[1]\hat{}D[4]\ DX[1]=D[0]\hat{}D[3]\ DX[0]=D[2]\ CRC[0]=DX[31]\hat{}C[30]\hat{}C[24]\ CRC[1]=DX[30]\hat{}C[31]\hat{}C[30]\hat{}C[25]\hat{}C[24]\ CRC[2]=DX[29]\hat{}C[31]\hat{}C[30]\hat{}C[26]\hat{}C[25]\hat{}C[24]\ CRC[3]=DX[28]\hat{}C[31]\hat{}C[27]\hat{}C[26]\hat{}C[25]\ CRC[4]=DX[27]\hat{}C[30]\hat{}C[28]\hat{}C[27]\hat{}C[26]\hat{}C[24]\ CRC[5]=DX[26]\hat{}C[31]\hat{}C[30]\hat{}C[29]\hat{}C[28]\hat{}C[27]\hat{}C[25]\hat{}C[24]\ CRC[6]=DX[25]\hat{}C[31]\hat{}C[30]\hat{}C[29]\hat{}C[28]\hat{}C[26]\hat{}C[25]\ CRC[7]=DX[24]\hat{}C[31]\hat{}C[29]\hat{}C[27]\hat{}C[26]\ CRC[8]=DX[23]\hat{}C[28]\hat{}C[27]\hat{}C[25]\hat{}C[24]\ CRC[9]=DX[22]\hat{}C[29]\hat{}C[28]\hat{}C[26]\hat{}C[25]\ CRC[10]=DX[21]\hat{}C[29]\hat{}C[27]\hat{}C[26]\hat{}C[24]\ CRC[11]=DX[20]\hat{}C[28]\hat{}C[27]\hat{}C[25]\hat{}C[24]\ CRC[12]=DX[19]\hat{}C[30]\hat{}C[29]\hat{}C[28]\hat{}C[26]\hat{}C[25]\hat{}C[24]\ CRC[13]=DX[18]\hat{}C[31]\hat{}C[30]\hat{}C[29]\hat{}C[27]\hat{}C[26]\hat{}C[25]CRC[14]=DX[17]\hat{}C[31]\hat{}C[30]\hat{}C[28]\hat{}C[27]\hat{}C[26]\ CRC[15]=DX[16]\hat{}C[31]\hat{}C[29]\hat{}C[28]\hat{}C[27]\ CRC[16]=DX[15]\hat{}C[29]\hat{}C$

[28]^C[24] CRC[17]=DX[14]^C[30]^C[29]^C[25]
CRC[18]=DX[13]^C[31]^C[30]^C[26] CRC[19]=
DX[12]^C[31]^C[27] CRC[20]=DX[11]^C[28]
CRC[21]=DX[10]^C[29] CRC[22]=DX[9]^C[24]
CRC[23]=DX[8]^C[30]^C[25]^C[24] CRC[24]=
DX[7]^C[31]^C[26]^C[25] CRC[25]=DX[6]^C
[27]^C[26] CRC[26]=DX[5]^C[30]^C[28]^C[27]
^C[24] CRC[27]=DX[4]^C[31]^C[29]^C[28]^C
[25] CRC[28]=DX[3]^C[30]^C[29]^C[26] CRC
[29]=DX[2]^C[31]^C[30]^C[27] CRC[30]=DX[1]
^C[31]^C[28] CRC[31]=DX[0]^C[29]     (Equation 3)

where CRC is the 32 bit CRC output, D is the 8 bit data input, DX is the intermediate data XOR evaluation, and C is a preloaded CRC register that is initialized to 32'hff_ff_ff_ff.

Figure 4:
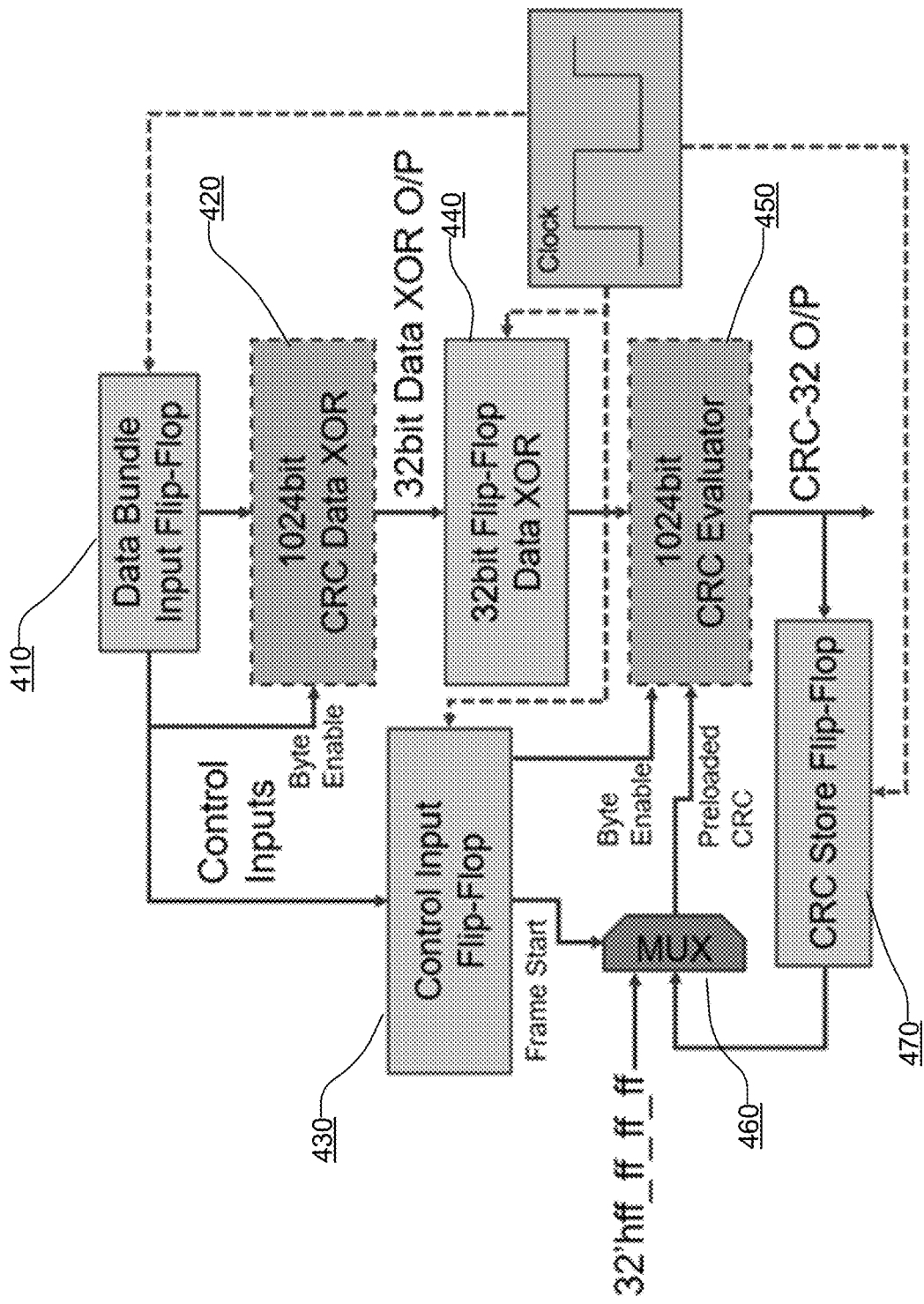
FIG. 4 shows the architecture of a CRC evaluator, according to an embodiment.

FIG. 4 shows the architecture of a CRC evaluator, according to an embodiment. The CRC evaluator includes a data bundle input flip-flop 410, a CRC data XOR 420, a control input flip-flop 430, a data XOR flip-flop 440, a CRC evaluator 450, and a pre-loaded CRC mux 460. Other embodiments may include other components.

FIG. 4 illustrates that the CRC evaluation for 1024 bits takes at least two clock cycles. The data bundle input flip-flop 410 represents the 1024-bit data bus input including control signals describing attributes of the data like start of frame, number of bytes valid and so on. The CRC data XOR 420 is a combinatorial block that evaluates the data XOR intermediate output based on the number of bytes valid in the 1024-bit data. The CRC data XOR 420 component uses a combination of the parallel XOR evaluators. The CRC data XOR 420 component takes in as input signal "byte enable" that determines the number of bytes in the 1024-bit block that are valid. The control input flip-flop 430 and the data XOR flip-flop 440 store the (intermediate) results of the 32-bit Data XOR operation output and the control data received from the data bundle input flip-flop 410. These flip-flops 430 and 440 help to break the long CRC logic into 2 parts. The CRC evaluator 450 is a combinatorial block that takes in the following inputs: (1) Data XOR Input: The 32-bit Data XOR evaluated on the data input in the previous clock cycle; Byte enable signal that signifies the number of bytes in the 1024-bit data that are valid; and Pre-loaded CRC register input as described in the CRC equations. The pre-loaded CRC mux 460 provides input to the CRC evaluator 450. An Ethernet frame size can range between 64 bytes to more than 9K bytes. Hence, the CRC over a frame can be evaluated over a single clock cycle or multiple clock cycles. As per the CRC equation, for the start of the CRC calculation in a frame the pre-loaded CRC register is initialized to 32'hff_ff_ff_ff. The multiplexer based on the start of frame input from the data control block assigns 32'hff_ff_ff_ff or the CRC evaluated in the previous cycle as input to the CRC evaluator. The CRC store flipflop 470 is used for storing partial results and providing them as input to the mux 460 for calculating the CRC by splitting the data into small chunks.

Figure 5:
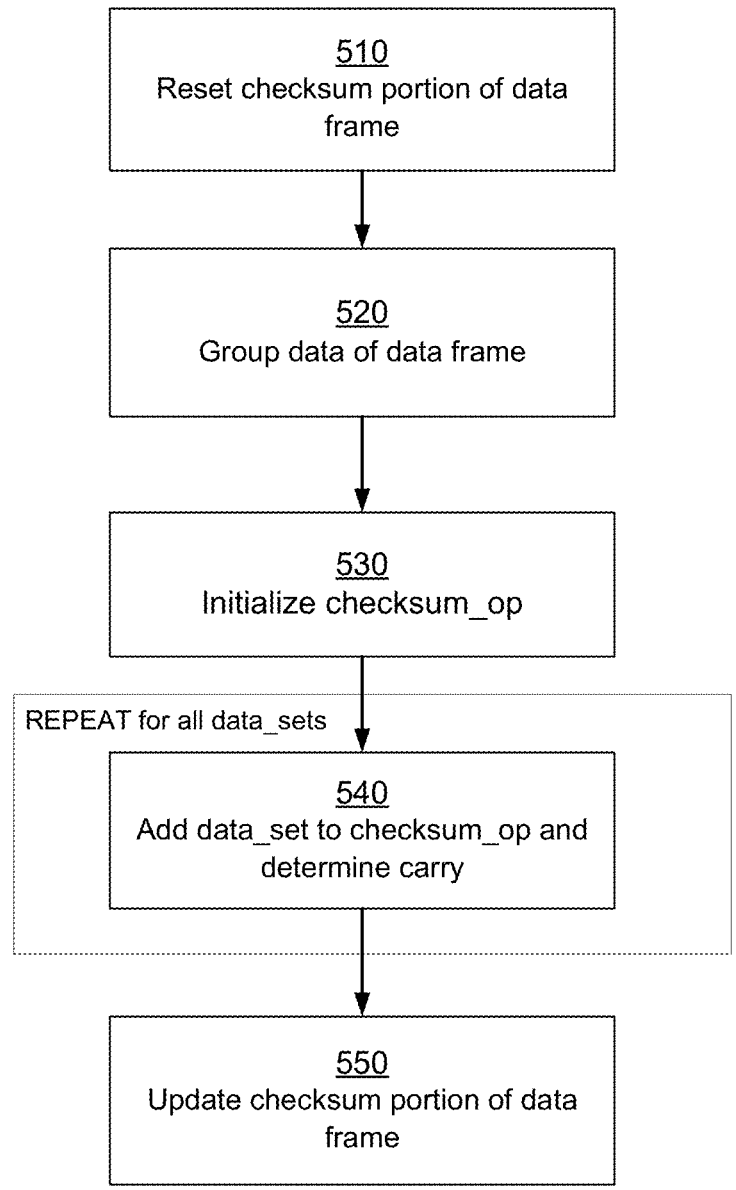
FIG. 5 shows the process for calculating a data frame's checksum, according to an embodiment.

FIG. 5 is the process 500 to calculate a data frame's checksum, according to an embodiment. The data frame is assumed to have N bytes with checksum present at location 'm' as shown in FIG. 3. The data is split into smaller chunks. For example, 100 byte data may be split into 50 chunks of two bytes each. If the number of bytes in the data frame is even, the data can be split into two byte chunks. If the number of bytes in the data frame is odd, there is one chunk that has a single byte. This chunk is padded with zeros in the least significant byte position. The chunks are added together to calculate the checksum. The checksum is a 16 but value with possibly a carry value. If there is a carry value, the carry is added back to the checksum being calculated. The addition may further result in a carry. So that carry is also added back to the checksum. This process of folding the carry is repeated until there is no carry left.

At 510, the 16-bit data in the frame where checksum will reside is reset to 0x0000, for example, as follows.

$$\{Frame[m], Frame[m+1]\} = 0x0000$$

At 520, for the N Byte frame (bytes labeled 0 to N−1), the bytes are grouped in bundles of M bit (e.g., 16 bit) data sets, starting from location 0. For example, data_set[k]={Frame[n], Frame[n+1]}, where $0 \leq n \leq N-2$, $0 \leq k \leq (N/2)-1$, for N even; $0 \leq k \leq ((N+1)/2)-1$, for N odd. If the number of bytes are odd, the last data set is padded with zeros on the least significant byte position.

$$\text{data\_set[last]} = \{Frame[N-1], 0x00\} \quad \text{(Equation 4.1)}$$

At 530, the 16-bit variable checksum_op is initialized to 0x0000. At 540, the data_set[k] created from is added to the checksum_op.

$$\{carry, checksum\_op\} = checksum\_op + data\_set[k] \quad \text{(Equation 4.2)}$$

The system checks if the 'carry' is generated after the addition. If carry is non-zero, the carry is added to checksum_op.

$$\{carry, checksum\_op\} = checksum\_op + carry$$

The steps of checking if carry is generated and adding carry to checksum_op is repeated until resultant 'carry' is 0.

Furthermore, the step 540 is repeated for all data sets (data_set[k]) created in step 520. At 550, the system updates the checksum portion of the data frame by replacing the bytes 'm' and 'm+1' with the 16-bit checksum_op.

Figure 6:
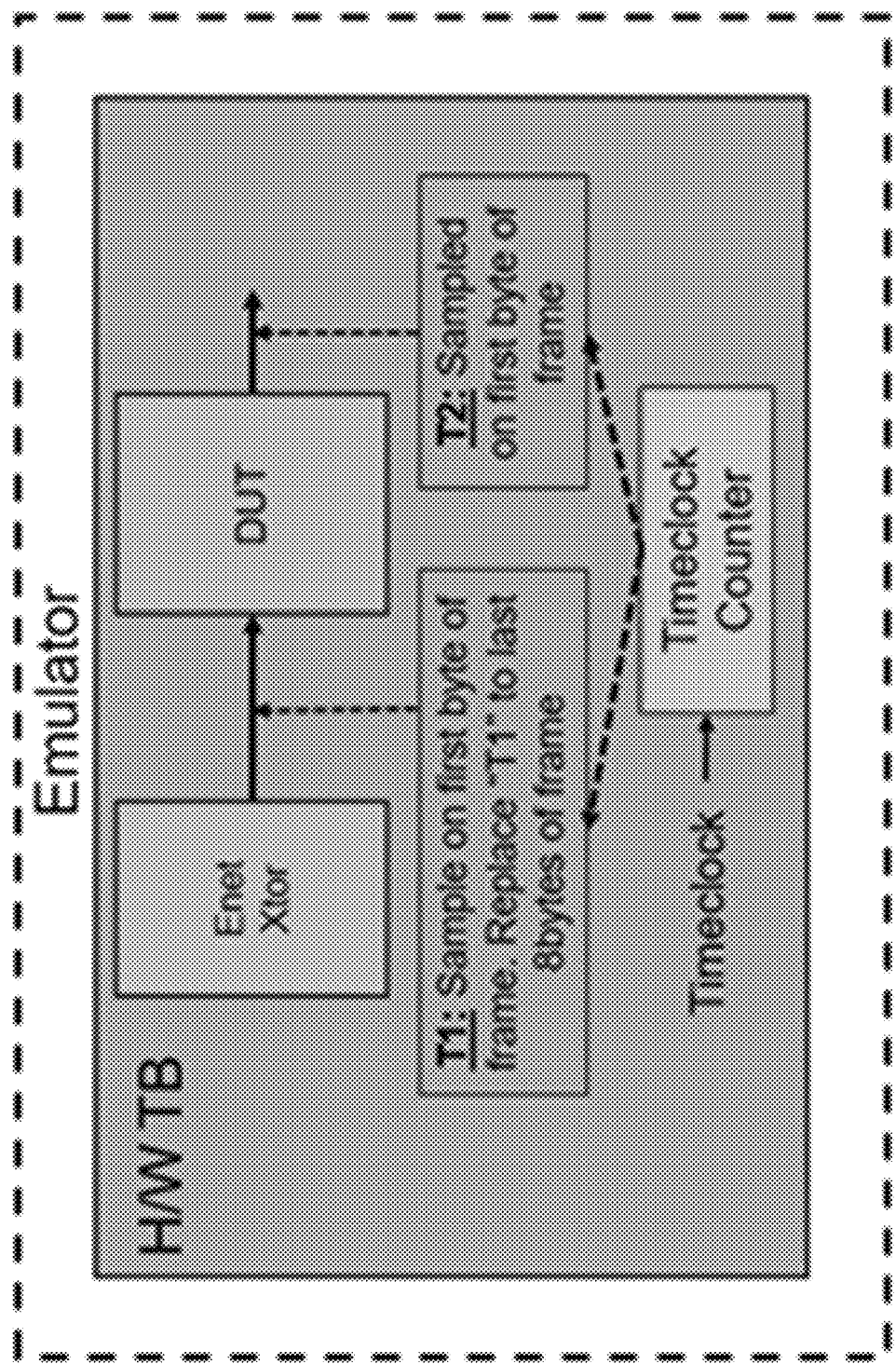
FIG. 6 illustrates latency calculation by timestamping a data frame, according to an embodiment.

FIG. 6 illustrates latency calculation with frame timestamping, according to an embodiment. The Ethernet transactor runs in the emulator, which accepts a timeclock counter of 64 bits as an input. The timeclock counter is a rollover 64-bit counter which is clocked with a mutually agreed upon time clock and shared across the emulation testbench. This implies that the counter value is visible at the transmitter of transactor and the receiver of DUT. So, the time calculations in terms of latency are calculated with respect to this counter.

The latency calculation is performed as follows. The value of the timeclock counter is sampled by the transactor when the frame's first byte is sent on the line. This sampled value is overwritten on the last 8 bytes of the Ethernet frame. The CRC of this Ethernet frame, because of this overwrite, needs to be recalculated. When the first byte of this frame is received on the DUT's final application output, the timeclock counter is sampled. The difference between the 64-bit value of the timeclock counter sampled at DUT's application output and the 64-bit value embedded in the Ethernet frame is the DUT's latency. It is the DUT's receiver latency from its input connected to the transactor to the application output with respect to the timeclock.

In SW transactor, where the full frame is present, the 8 bytes of timestamping data is missing. For the final frame (timestamped) to be sent out from the HW transactor the checksum cannot be calculated in SW transactor. In HW transactor where the timestamp data is present, since the HW gets visibility to the frame in chunks of 128-bytes, the checksum cannot be calculated as the full frame is not visible.

Figure 7:
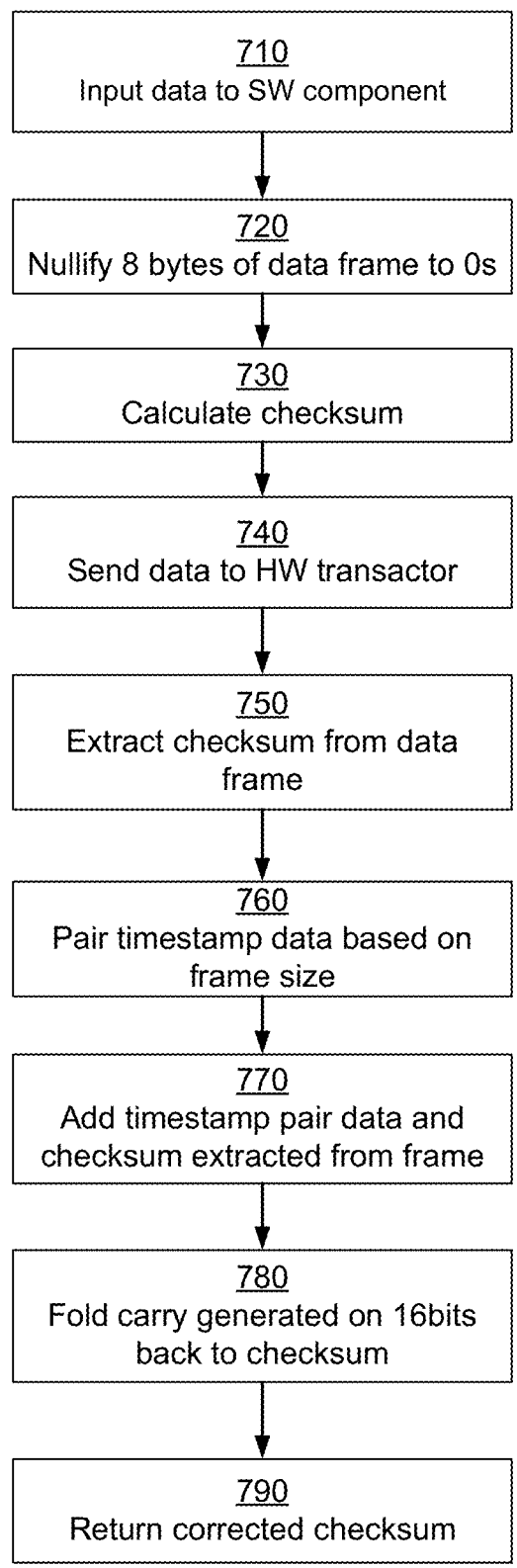
FIG. 7 shows a flow diagram for checksum correction for timestamping, according to an embodiment.

FIG. 7 shows a flow diagram for checksum correction for timestamping according to an embodiment. The checksum calculation is split between the SW transactor and HW transactor. At 710, the data frame is input to the SW component. At 720, in the SW transactor, the data frame's last 8-bytes are nullified to 0x00. The last 8 bytes of the data frame will be overridden by the HW transactor for timestamp.

At 730, the checksum for the frame is calculated and written to the frame's checksum field. In the per frame control inputs to the HW transactor, the following information is sent at 740: (a) a byte location of checksum in the frame. If the byte location is written as 0, then the frame has no checksum field in it; and (b) information indicating whether the frame size is even or odd. In the HW transactor there will be a checksum re-evaluator which will keep tracking every frame for the presence of checksum field.

On the clock cycle that the HW transactor receives the checksum field, the checksum is extracted from the data frame at 750. Assume that the checksum extracted is CS1. Accordingly, CST is the checksum calculated from the SW transactor assuming the timestamp fields are 0. To correct the checksum for insertion of timestamp, first the timestamp 64-bit is grouped as required by the checksum evaluation process.

Assume that the timestamp bytes are {T0, T1, T2, T3, T4, T5, T6, T7} and checksum for the timestamped frame is CS2. The process for fixing the checksum in the HW transactor is as follows. At 760, the timestamp data is paired based on frame size. For a frame with even number of bytes, the 16-bit timestamp field grouping is added to an 18-bit TCS field storing the total checksum as the following equation 5 for frame with even number of bytes.

$$TCS=\{T0,T1\}+\{T2,T3\}+\{T4,T5\}+\{T6,T7\} \quad \text{(Equation 5)}$$

For a frame with odd number of bytes, at 770, the 16-bit timestamp field grouping is added to 18-bit TCS field as equation 6. The frame is padded with zeros at the least significant byte position of one of the data sets obtained by grouping bytes.

$$TCS=\{0x00,T0\}+\{T1,T2\}+\{T3,T4\}+\{T5,T6\}+\{T7, 0x00\} \quad \text{(Equation 6)}$$

If TCS[17:16] is greater than 0, it is added back to TCS as shown in equation 7 to fold 780 carry to the checksum at 780. This step is repeated till TCS[17:16] is 0.

$$TCS=TCS[17:16]+TCS[15:0] \quad \text{(Equation 7)}$$

CST is added to TCS for checksum correction to precalculated checksum.

$$TCS=TCS+CS1 \quad \text{(Equation 8)}$$

TCS[15:0] is returned at 790 as the final checksum for the timestamp injected frame.

The following is the description of the process to correct the CRC of a frame which is checksum corrected by the Ethernet transactor. As shown in equation 3, the 8-bit CRC evaluator determines an XOR output of 2 operations: (1) a first computation for evaluating the 32-bit data XOR on the data of the data frame; and (2) a second computation for evaluating the CRC transformation based on the input pre-loaded CRC value.

The following equation represents a generalized representation of n-byte CRC evaluator.

$$CRC(f)=DX(f) \char`\^ CT(n) \quad \text{(Equation 9)}$$

where CRC(f) refers to the function to calculate CRC of a frame; DX(f) refers to the function to calculate data XOR of a frame; CT(n) refers to a CRC transform function for 'n' bytes preloaded with 0xffffffff; f refers to a byte stream of 'n' bytes representing the frame; and n is a number of bytes in the frame 'f'.

Both the CRC(f) and DX(f) equations are different based on the size of the data input. The CRC correction process is described by reducing the scope of the timestamp CRC correction problem to a frame with size 6 bytes. For example, assume that the 6-byte frame is 'B1-B2-B3-B4-B5-B6' and the CRC calculated over this frame is Ci.

If the $3^{rd}$ and $4^{th}$ bytes of the frame are changed with bytes S1-S2, the new frame is 'B1-B2-S1-S2-B5-B6'. This represents the situation for the Ethernet frame where the bytes in the middle of the frame are changed due to checksum correction. Assume that the CRC of this new frame is Cf. To illustrate the CRC correction process, the 6 byte frame is split into 2 parts: (1) a front portion occurring before the checksum location in the data frame including the checksum itself, e.g., a 4 byte frame 'B1-B2-B3-B4' (F1) with CRC C1 which is changed to 'B1-B2-S1-S2' (F2) with CRC C2; and (2) a back portion occurring after the checksum in the data frame, for example, the 2 byte frame 'B5-B6'. (F3).

If the frame F1's last 2 bytes are replaced with 0 the byte string becomes B1-B2-0x00-0x00, and the CRC of this frame is C1'. As per Equation 9, the values of C1, C2, and C1' are as follows.

$$C1=DX1 \char`\^ CT1$$

$$C2=DX2 \char`\^ CT2$$

$$C1'=DX1' \char`\^ CT1'$$

The following equations represent CRC equations for the example frames.

$$\begin{aligned} &C1=CRC(B1\text{-}B2\text{-}B3\text{-}B4)\ C2=CRC(B1\text{-}B2\text{-}S1\text{-}S2)\\ &\quad C1'=CRC(B1\text{-}B2\text{-}0x00\text{-}0x00)\ DX1=DX(B1\text{-}B2\text{-}\\ &\quad B3\text{-}B4)\ DX2=DX(B1\text{-}B2\text{-}S1\text{-}S2)\ DX1'=DX(B1\text{-}\\ &\quad B2\text{-}0x00\text{-}0x00)\ CT1=CT(4)\ CT2=CT(4)\\ &\quad CT1'=CT(4) \end{aligned} \quad \text{(Equation 10)}$$

As per Equation 9, the value of CT for a 4-byte frame is always the same as the initial CRC loaded register which remains unchanged i.e., 32'hff_ff_ff_ff. The following equation 11 represents a CRC transformation equality.

$$CT1=CT2=CT1'=CT(4) \quad \text{(Equation 11)}$$

The difference between C1 and C1' is because of the value change in DX(f). The XOR operation on any bit value with 1'b0 yields same bit as output i.e. A ^1'b0=A.

If the input 4-byte frame is represented as a string of 32 bits, D[31:0] (read 0 to 31), replacing B3 and B4 by 0x00 is performed by assigning D[31:16] to 0. This evaluation is the same as removing all entries of D[x], where 'x' is between 31 and 16 in the 4-byte frame equation of DX(f).

For frame B1-B2-S1-S2, the evaluation of the bits D[31:16] is inserted to the 4 byte DX(f) equation. Accordingly, the value of DX2 is obtained as follows.

$$DX2=DX1' \char`\^ DX2' \quad \text{(Equation 12)}$$

Where, DX2'=Value to XOR with DX1' for inserting D[31:16]={S2, S1}

DX2' can be calculated from the 4 byte DX(f) equation and feeding it a pattern of 0x00-0x00-S1-S2. Similar to DX1', D[15:0]=0 negates its impact on the data XOR value, giving the output as the missing data XOR component of DX2 from DX1'. Following equation (13) is used to calculate DX2'.

$$DX2'=DX(0x00\text{-}0x00\text{-}S1\text{-}S2) \quad \text{(Equation 13)}$$

Once DX2' is determined, C2 is calculated using following equation 14.

$$C2=C1' \char`\^ DX2' \quad \text{(Equation 14)}$$

The steps mentioned above are for an exemplary data frame which is 4 bytes in size.

An 'n' byte CRC evaluator can be daisy chained with 8 bit evaluators. As shown in equation 9 if the initial CRC register value is 32'h00_00_00_00, the CT(n) component is 0 and has no impact on CRC. Accordingly, CRC(f)=DX(f). Accordingly, DX(f) can be evaluated with a daisy chain of 8 bit DX evaluators.

Figure 8:
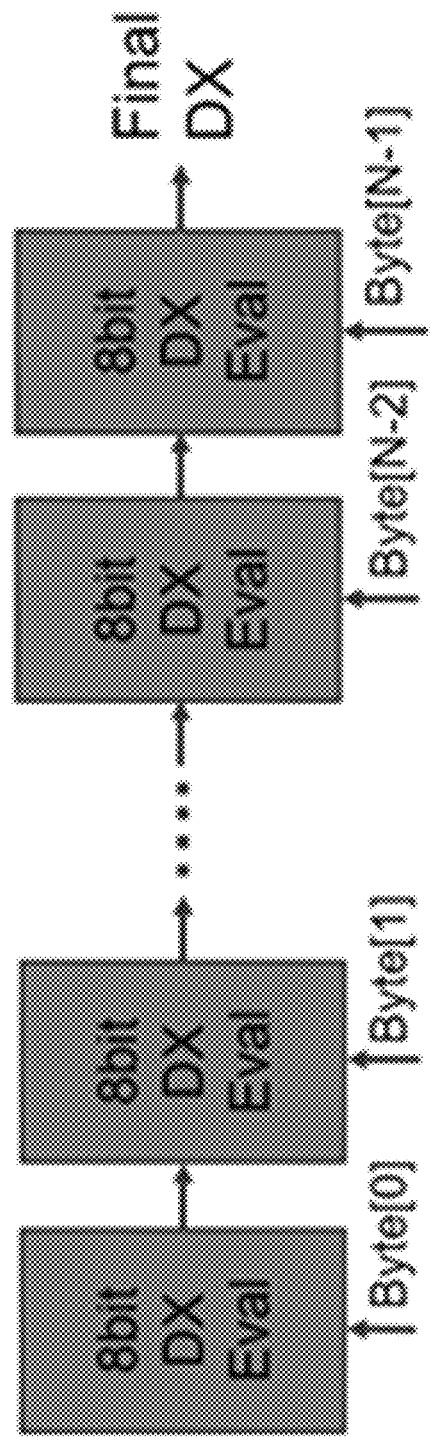
FIG. 8 illustrates a daisy chained DX evaluator, according to an embodiment.

FIG. 8 illustrates a daisy chained DX evaluator according to an embodiment. As illustrated in FIG. 8, if Byte[0] to Byte[N−3] are all 0x00, then all the 8 bit DX evaluators prior to Byte[N−2] will have no impact on the result since all results before N−2 will be 0. In general, for 'n' bytes, if 'm' is the first non-zero byte (0<m<n), following equation describes computation for frames with initial bytes 0x00.

$$DX(f)=DX(f')\tag{Equation 15}$$

Here f=n byte frame, f[0:n−1], f'=the frame 'f' discarding the initial zero bytes, f[m:n−1]. Similarly, following equation shows computation of DX2' in terms of DX.

$$DX2'=DX(S1\text{-}S2)\tag{Equation 16}$$

Equation 14 can be rewritten to calculate C2 with reduced DX2 as follows.

$$C2=C1\char`\^DX(S1\text{-}S2)\tag{Equation 17}$$

The calculation of the CRC for frame B1-B2-S1-S2, can be extended to calculate the CRC for frame B1-B2-S1-S2-B5-B6 (Cf). The CRC is evaluated as following equation that determined Cf.

$$Cf=DX(B5\text{-}B6)\char`\^CT'(2)\tag{Equation 18}$$

where CT'=Transform function for CRC preloaded with the CRC for B1-B2-S1-S2 (C2)

The following equation is used to calculate CT'(2).

$$CT'(2)=CT''(2)\char`\^CT'''(2)\tag{Equation 19}$$

where
CT'=Transform function for CRC preloaded with the CRC for B1-B2-S1-S2 (C2)
CT''=Transform function for CRC preloaded with the CRC for B1-B2-0x00-0x00 (C1') CT'''=Transform function for CRC (CT(n)) preloaded with DX(S1-S2)

Equation 18 is used to calculate Cf splitting the CRC transform.

$$Cf=DX(B5\text{-}B6)\char`\^CT''(2)\char`\^CT'''(2)\tag{Equation 20}$$

The CRC evaluation of a frame can be daisy chained. Accordingly, CRC for frame B1-B2-0x00-0x00-B5-B6 can be calculated by first calculating CRC of B1-B2-0x00-0x00 with initial seed 0xFF_FF_FF_FF and then calculating CRC of B5-B6 with initial seed value as the output of step 1.

Based on this, from Equation 20, DX(B5-B6) ^CT''(2) can be represented as a daisy chained operation when the output of CRC(B1-B2-0x00-0x00) is loaded as an input seed to CRC(B5-B6). This can then be generalized as CRC(B1-B2-0x00-0x00-B5-B6).

$$CRC(B1\text{-}B2\text{-}0x00\text{-}0x00\text{-}B5\text{-}B6)=DX(B5\text{-}B6)\char`\^CT''(2)$$
$$Cf=Cx\char`\^CT'''(2)\tag{Equation 21}$$

where Cx=CRC of the frame B1-B2-0x00-0x00-B5-B6 and CT'''=Transform function for CRC (CT(n)) preloaded with DX(S1-S2).

The above process is applied for processing Ethernet frames with checksum correction. For an Ethernet frame of 'n' bytes and the checksum field at byte 'm', the CRC for the frame can be recalculated as follows. The CRC of the Ethernet Frame is calculated with bytes 'm' and 'm+1' as 0x00. For the recalculated checksum at bytes 'm' and 'm+1' the Data XOR is evaluated. The CRC transform is calculated for the bytes left (n−m−1) preloaded with the output of evaluation of the data XOR.

The final CRC of the checksum corrected frame is determined as follows using the XOR operation represented as '^'.

$$CRC(F')=CRC(F)\char`\^CORR(n\text{-}m\text{-}1)\tag{Equation 22}$$

Where, F'=Ethernet frame of 'n' bytes with recalculated checksum; F=Ethernet frame of 'n' bytes with bytes 'm' and 'm+1' to 0x00; CORR(x)=Output of CT(n−m−1) preloaded with seed DX(CHSM), where CHSM is the recalculated checksum.

Figure 9:
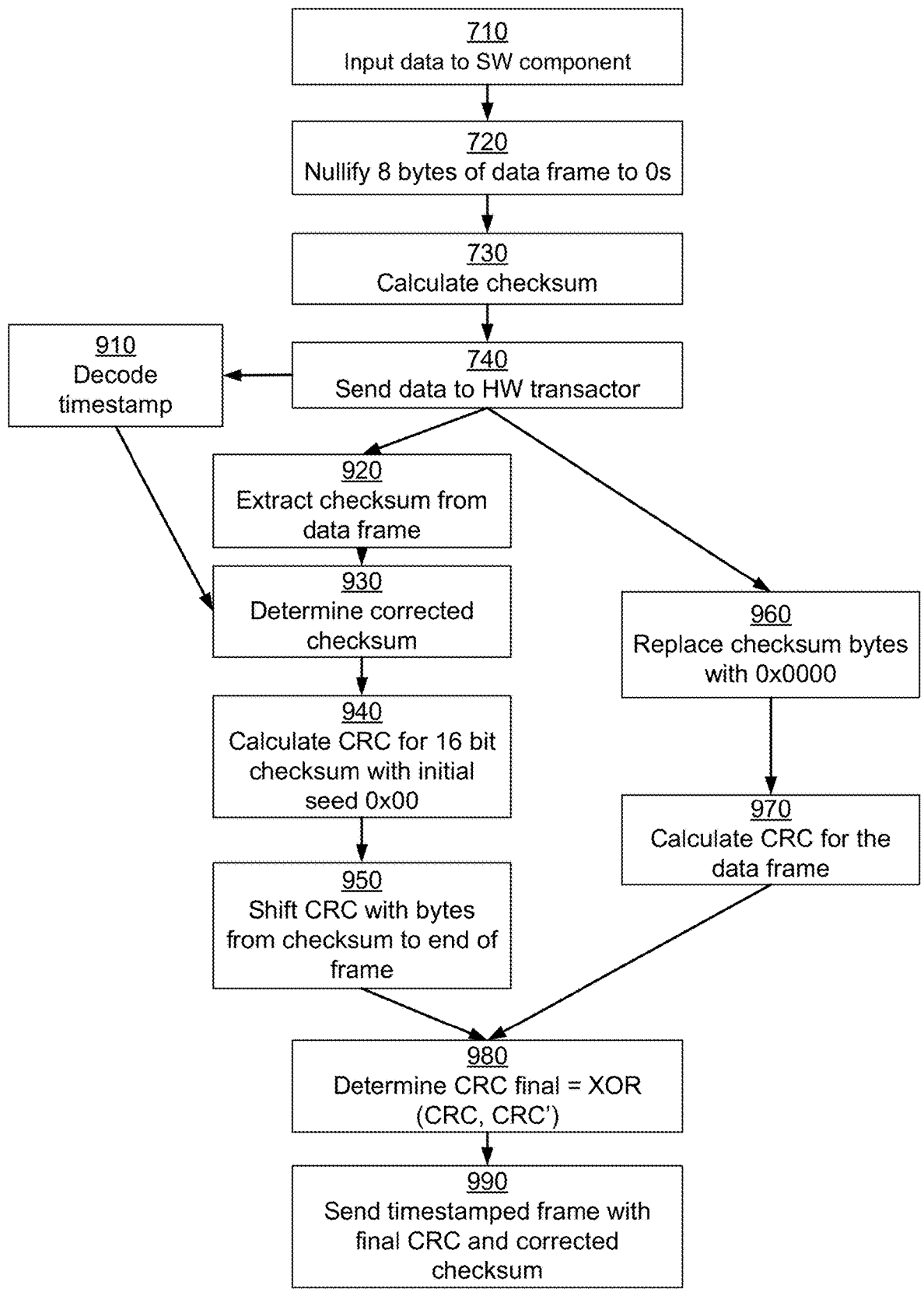
FIG. 9 shows a flow diagram of the process to correct checksum and CRC for a timestamped packet, according to an embodiment.

FIG. 9 shows a flow diagram of the overall process to correct checksum and CRC for a timestamped packet according to an embodiment. The process is described with the assumptions that the Ethernet frame has n bytes, the Ethernet frame has a checksum field at byte location 'm', and the Ethernet transactor HW is built on a data bus of 128-bytes. However, the steps can be applied to other configurations and parameters.

The steps 710, 720, 730, and 740 correspond to those shown in FIG. 7. Accordingly, at 710, the data frame is input to the SW component of the transactor. At 720, the last 8 bytes of the data frame are nullified to zero. At 730, the checksum is calculated and the data frame is sent to the HW transactor at 740. The control header of the packet sent to the HW transactor includes a byte location of the checksum and a bit indicating whether the frame has an even or odd boundary.

The steps 960 and 970 determine the CRC for the data frame and the steps 920, 930, 940, 950 determine the CRC correction term based on the checksum. The checksum bytes of the data frame are nullified by replacing the corresponding bytes with zeros. The CRC evaluator is executed to calculate the CRC for the data frame with checksum bytes nullified.

The CRC correction term based on the checksum is determined by performing the steps 910, 920, 930, 940, and 950. At 910, the HW transactor decodes the checksum header location and even/odd input from control header at the start of the frame. At 920, the checksum is extracted from the data frame. At 930, a corrected checksum is determined based on the data frame including the timestamp value (e.g., using the process illustrated in FIG. 7). Determining the corrected checksum includes pairing timestamp data based on whether the frame size is even or odd, adding timestamp pair data and checksum extracted from the data frame, folding carry generated from 16 bits back to the checksum and correcting the checksum. At 940, the CRC value is calculated for the checksum with initial seed all zeros, e.g., 0x00. At 950, the CRC correction term is shifted with bytes from checksum to the end of the data frame.

At 960, the checksum bytes of the data frame are nullified by replacing the corresponding bytes with zeros. At 970, the CRC is determined for the data frame with checksum bytes nullified. At 980, a final CRC is determined by performing an XOR operation with the CRC correction term CRC' determined at 950 and the CRC determined at 970. The timestamped data frame having the final CRC and corrected checksum is sent at 990.

According to an embodiment, the process for calculating the CRC is as follows. Some of the steps of the following process overlap with the process in FIG. 9. (1) In the SW transactor or testbench, the checksum for the frame is evaluated assuming the timestamp fields to be 0x00. (2) In the frame the checksum calculated in step 1 is appended to the designated field (bytes 'm' and 'm+1'). (3) The frame is sent to the HW transactor. The transmission is performed up to 128-bytes per HW clock. (4) In the control header of the packet sent to the HW the following are appended: byte location of the checksum, and bit indicating whether the frame has even or odd boundary. (5) The HW transactor decodes the checksum header location and bit indicating even/odd input from control header at the start of the frame. (6) At the input of the CRC evaluator, the bytes 'm' and 'm+1' are nullified to 0x00. This nullify is only done to the CRC evaluator input and the original data stream is kept unaltered. (7) At the timestamping module, search is performed for the clock cycle where checksum will be present for the ongoing frame.

(8) In the clock cycle where the checksum is present following steps are performed: (a) The checksum present from the frame (as calculated in step 1) is extracted. (b) Data sets are created for checksum correction from the timestamp data based on the even/odd input. (c) The checksum is corrected based on the extracted checksum and timestamp data sets. (d) The corrected checksum is replaced to the frame. (e) The CRC Data XOR is calculated for the recalculated checksum. (f) Based on the number of bytes left of the frame in the current clock cycle, the CRC transform function is executed preloaded with output from step (e). (g) If the current frame ends in the same clock: (i) XOR is performed of the output of step (f) with the frame's CRC to get the final CRC. The frame's CRC in this step is the output of the CRC evaluator which as per step 6 is calculated over the frame with bytes 'm' and 'm+1' as 0x00. (ii) Exit to step 1. (h) If the current frame does not end in this clock, the output from step (f) is stored. This stored variable is called 'stored_checksum_crc'.

(9) At this stage the current frame did not end in the same clock as the checksum. Following steps are performed. (a) Track for the end of the current frame per clock. All steps below are defined per clock. (b) If the frame ends: (i) Based on the number of bytes of the frame in the clock the CRC transform function preloaded with the 'stored_checksum_crc' is called. (ii) XOR is performed of the output of the previous step with the frame's CRC to get the final CRC. The frame's CRC in this step is the output of the CRC evaluator which as per step 6 is calculated over the frame with bytes 'm' and 'm+1' as 0x00. (iii). Exit to step 1 (c) If the frame does not end: (i) Based on the number of bytes of the frame in the clock the CRC transform function preloaded with the 'stored_checksum_crc' is called. (ii) The value of 'stored_checksum_crc' is updated with the output of the previous step. (iii) Exit to step 9.

Figure 10:
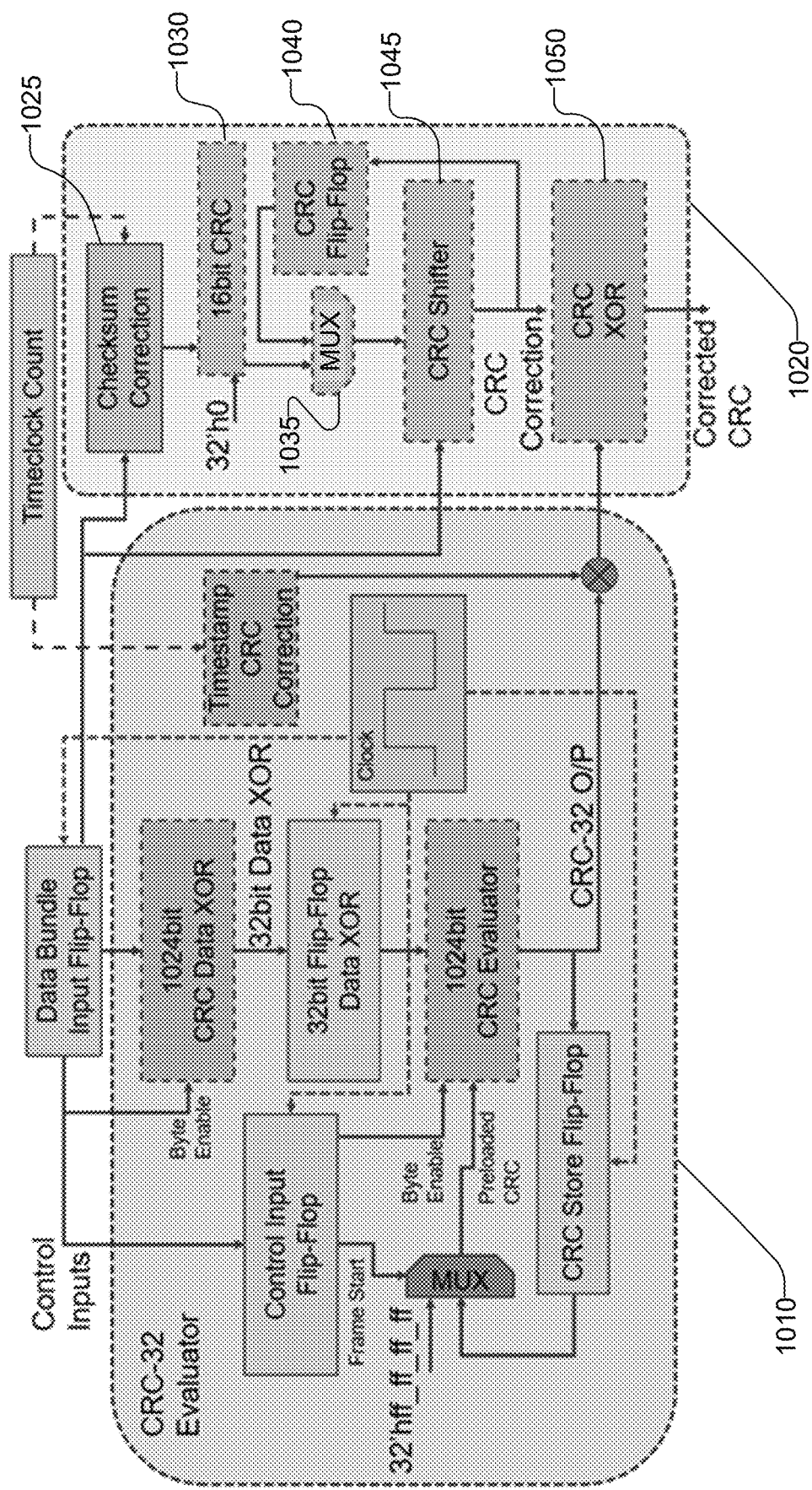
FIG. 10 illustrates a hardware implementation for checksum corrected frame CRC correction, according to an embodiment.

FIG. 10 illustrates a hardware implementation for checksum corrected frame CRC correction according to an embodiment. Hardware 1010 represents the components of the CRC evaluator for determining the CRC value for a data frame as shown in FIG. 4. Hardware 1020 is the additional logic added for checksum recalculation with CRC correction. The hardware 1020 includes a checksum correction component 1025 tat provides data to 16 bit CRC component 1030. The 16 bit CRC component 1030 receives 32 bit data initialize to zeros. The data is shifted using the CRC shifter 1045. The CRC flip-flop 1040 stores partial results that are fed as input to the CRC shifter 1045 via the multiplexer 1035. The final result of the CRC shifter 1045 is provided as input to the CRC XOR component 1050 to perform an XOR of the output generated by the hardware 1010 with the output of the CRC shifter 1045 to generate the corrected CRC value.

Figure 11:
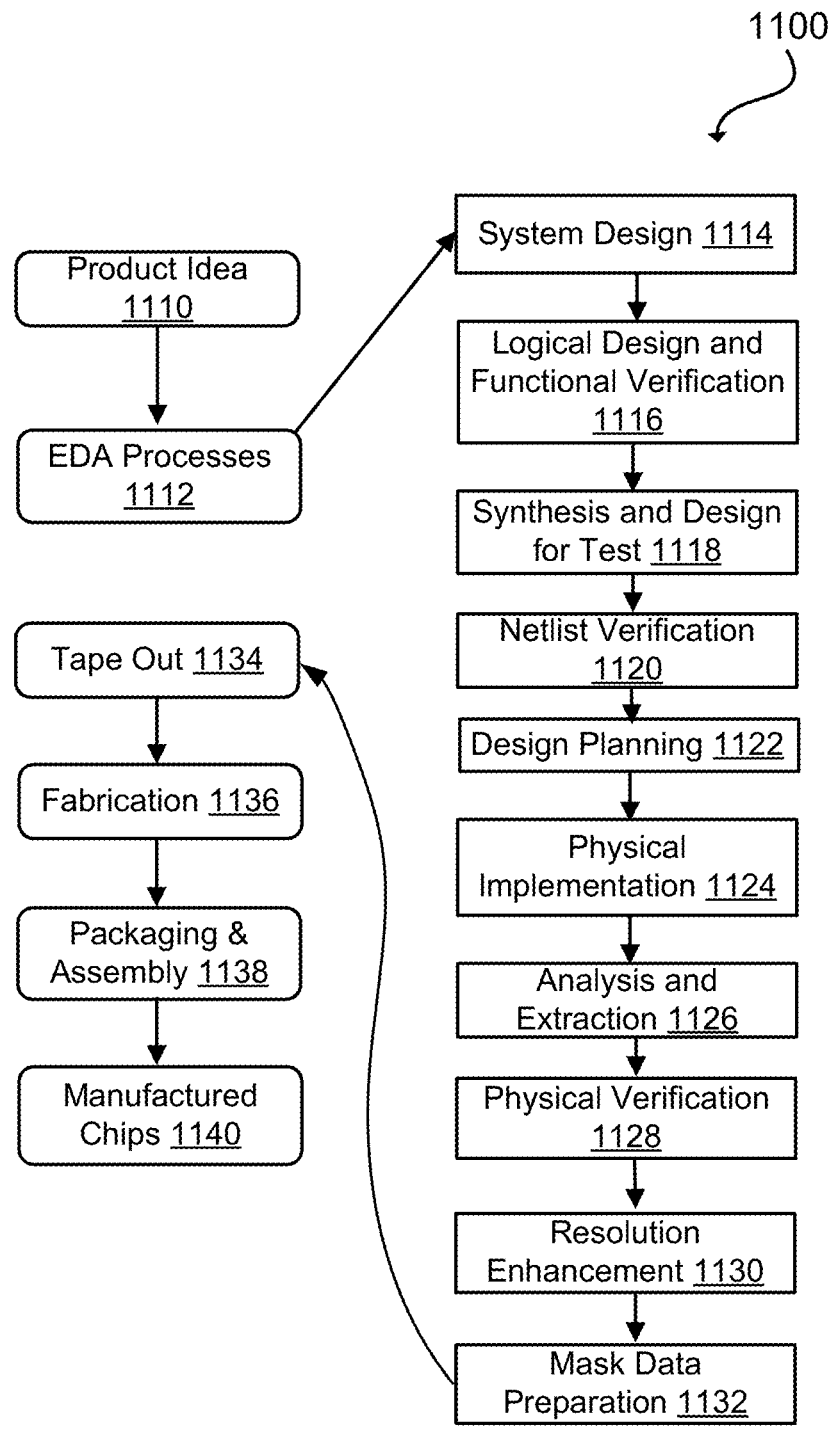
FIG. 11 depicts a flowchart of various processes used during the design and manufacture of an integrated circuit, in accordance with some embodiments of the present disclosure.

FIG. 11 illustrates an example set of processes 1100 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1110 with information supplied by a designer, information which is transformed to create an article of manufacture that uses a set of EDA processes 1112. When the design is finalized, the design is taped-out 1134, which is when artwork (e.g., geometric patterns) for the integrated circuit is sent to a fabrication facility to manufacture the mask set, which is then used to manufacture the integrated circuit. After tape-out, a semiconductor die is fabricated 1136 and packaging and assembly processes 1138 are performed to produce the finished integrated circuit 1140.

Specifications for a circuit or electronic structure may range from low-level transistor material layouts to high-level description languages. A high-level representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more concrete description adds more useful detail into the design description, for example, more details for the modules that include the description. The lower levels of representation that are more concrete descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 11. The processes described by be enabled by EDA products (or tools).

During system design 1114, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1116, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1118, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1120, the netlist is checked for compliance with timing constraints and for correspondence with the HDL code. During design planning 1122, an overall floor plan for the integrated circuit is constructed and analyzed for timing and top-level routing.

During layout or physical implementation 1124, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1126, the circuit function is verified at the layout level, which permits refinement of the layout design. During physical verification 1128, the layout design is checked to ensure that manufacturing constraints are correct, such as DRC constraints, electrical constraints, lithographic constraints, and that circuitry function matches the HDL design specification. During resolution enhancement 1130, the geometry of the layout is transformed to improve how the circuit design is manufactured.

During tape-out, data is created to be used (after lithographic enhancements are applied if appropriate) for production of lithography masks. During mask data preparation 1132, the 'tape-out' data is used to produce lithography masks that are used to produce finished integrated circuits.

A storage subsystem of a computer may be used to store the programs and data structures that are used by some or all of the EDA products described herein, and products used for development of cells for the library and for physical and logical design that use the library.

Figure 12:
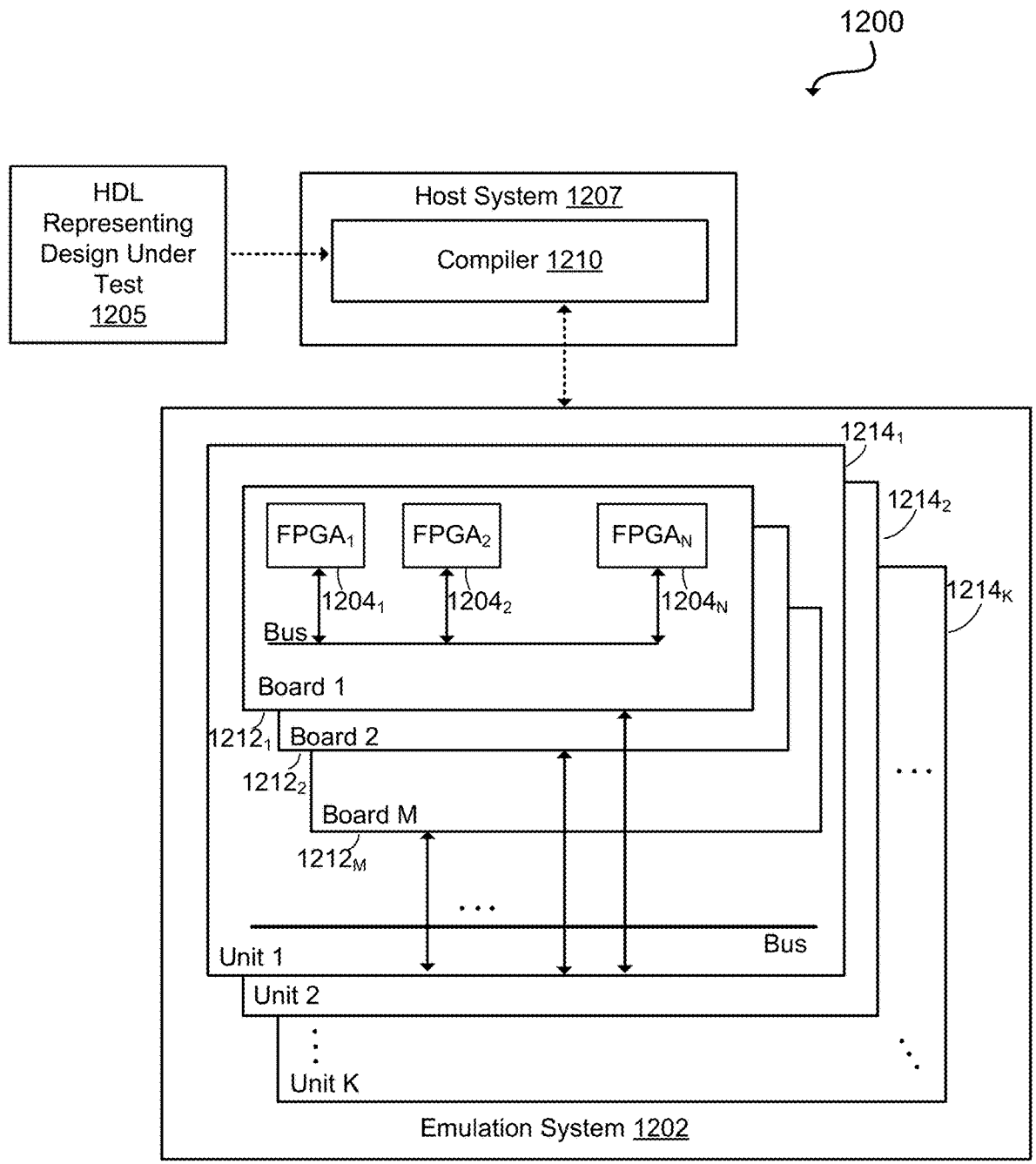
FIG. 12 depicts a diagram of an example emulation system, in accordance with some embodiments of the present disclosure.

FIG. 12 depicts a diagram of an example emulation environment 1200. An emulation environment 1200 may be configured to verify the functionality of the circuit design. The emulation environment 1200 may include a host system 1207 (e.g., a computer that is part of an EDA system) and an emulation system 1202 (e.g., a set of programmable devices such as Field Programmable Gate Arrays (FPGAs) or processors). The host system generates data and information by using a compiler 1210 to structure the emulation system to emulate a circuit design. A circuit design to be emulated is also referred to as a Design Under Test ('DUT') where data and information from the emulation are used to verify the functionality of the DUT.

The host system 1207 may include one or more processors. In the embodiment where the host system includes multiple processors, the functions described herein as being performed by the host system can be distributed among the multiple processors. The host system 1207 may include a compiler 1210 to transform specifications written in a description language that represents a DUT and to produce data (e.g., binary data) and information that is used to structure the emulation system 1202 to emulate the DUT. The compiler 1210 can transform, change, restructure, add new functions to, and/or control the timing of the DUT.

The host system 1207 and emulation system 1202 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 1207 and emulation system 1202 can exchange data and information through a third device such as a network server.

The emulation system 1202 includes multiple FPGAs (or other modules) such as FPGAs $1204_1$ and $1204_2$ as well as additional FPGAs to $1204_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 1202 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $1204_1$-$1204_N$ may be placed onto one or more boards $1212_1$ and $1212_2$ as well as additional boards through $1212_M$. Multiple boards can be placed into an emulation unit $1214_1$. The boards within an emulation unit can be connected using the backplane of the emulation unit or any other types of connections. In addition, multiple emulation units (e.g., $1214_1$ and $1214_2$ through $1214_K$) can be connected to each other by cables or any other means to form a multi-emulation unit system.

For a DUT that is to be emulated, the host system 1207 transmits one or more bit files to the emulation system 1202. The bit files may specify a description of the DUT and may further specify partitions of the DUT created by the host system 1207 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 1207 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 1207 and/or the compiler 1210 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 1205 into gate level logic. For a DUT that is to be emulated, the design synthesizer sub-system receives a description of the DUT. If the description of the DUT is fully or partially in HDL (e.g., RTL or other level of representation), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 13:
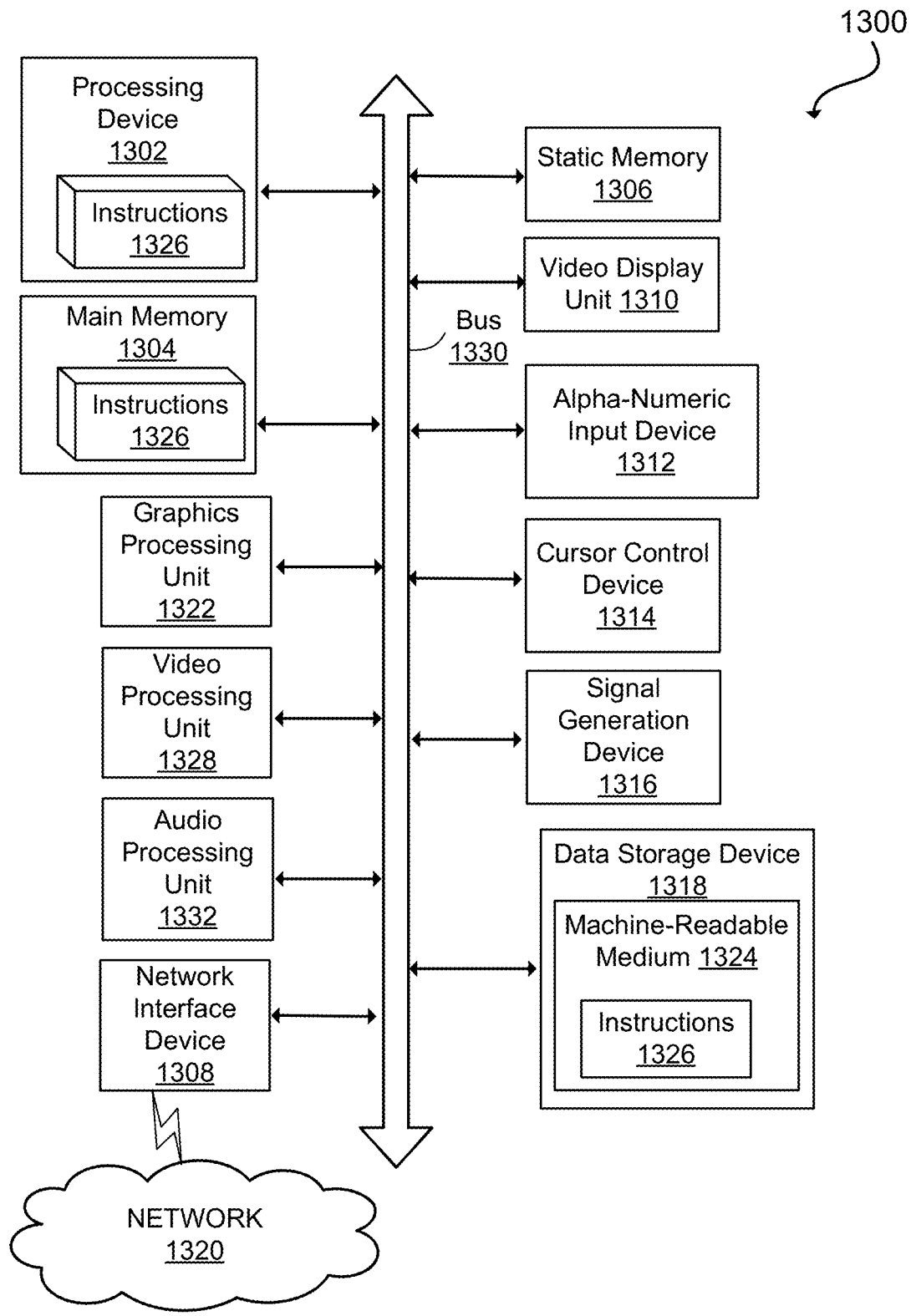
FIG. 13 depicts a diagram of an example computer system in which embodiments of the present disclosure may operate.

FIG. 13 illustrates an example machine of a computer system 1300 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1300 includes a processing device 1302, a main memory 1304 (e.g., read-only memory (ROM), flash memory, dynamic random access memory (DRAM) such as synchronous DRAM (SDRAM), a static memory 1306 (e.g., flash memory, static random access memory (SRAM), etc.), and a data storage device 1318, which communicate with each other via a bus 1330.

Processing device 1302 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. The processing device 1302 may be configured to execute instructions 1326 for performing the operations and steps described herein.

The computer system 1300 may further include a network interface device 1308 to communicate over the network 1320. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), a graphics processing unit 1322, a signal generation device 1316 (e.g., a speaker), graphics processing unit 1322, video processing unit 1328, and audio processing unit 1332.

The data storage device 1318 may include a machine-readable storage medium 1324 (also known as a non-transitory computer-readable medium) on which is stored one or more sets of instructions 1326 or software embodying any one or more of the methodologies or functions described herein. The instructions 1326 may also reside, completely or at least partially, within the main memory 1304 and/or within the processing device 1302 during execution thereof by the computer system 1300, the main memory 1304 and the processing device 1302 also constituting machine-readable storage media.

In some implementations, the instructions 1326 include instructions to implement functionality corresponding to the present disclosure. While the machine-readable storage medium 1324 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1302 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for verification of a data frame, comprising:
   receiving a data frame including a first portion for storing an initial checksum value and a second portion for storing a timestamp value, wherein the second portion of data frame is set to zero;
   receiving a timestamp value for including in the second portion of the data frame;
   determining, by a processor, a modified checksum value based on the initial checksum value included in the first portion of the data frame and the timestamp value;

determining a cyclic redundancy check (CRC) value for
the data frame by nullifying the initial checksum value
in the data frame and including the timestamp value;
determining a final CRC value by combining the CRC
value for the data frame and a CRC correction value
based on the modified checksum value; and
sending a modified data frame including the modified
checksum value and the final CRC value.

2. The method of claim 1, wherein the modified data frame is processed by a design under test, wherein the timestamp value is a first timestamp value, the method further comprising:
determining a second timestamp value after the design under test processes the data frame; and
determining a latency of the data frame based on a difference between the second timestamp value and the first timestamp value.

3. The method of claim 1, further comprising:
shifting the CRC value based om data from the checksum to the end of the data frame.

4. The method of claim 1, wherein the first portion is located within a threshold distance of a middle of the data frame and the second portion is located at an end of the data frame.

5. The method of claim 1, wherein the data frame is an Ethernet packet and wherein the modified data frame is used by an Ethernet transactor for performance verification of the data frame.

6. The method of claim 1, wherein determining the final CRC value by combining the CRC value with the CRC correction value comprises calculating an XOR of the CRC value and the CRC correction value.

7. The method of claim 1, wherein responsive to generating a carry value while determining the modified checksum value, adding the carry value to the modified checksum value being determined.

8. A circuit configured to:
receive a data frame including a first portion for storing a checksum value and a second portion for storing a timestamp value, wherein the second portion of data frame is set to zero;
receive a timestamp value for including in second portion of the data frame;
determine a modified checksum value based on the checksum value included in the first portion of the data frame and the timestamp value;
determine a cyclic redundancy check (CRC) value for the data frame by nullifying the checksum value in the data frame and including the timestamp value;
determine a final CRC value by combining the CRC value for the data frame and a CRC correction value based on the checksum value; and
send a modified data frame including the modified checksum value and the final CRC value.

9. The circuit of claim 8, wherein the modified data frame is processed by a design under test, wherein the timestamp value is a first timestamp value, further configured to:
determine a second timestamp value after the design under test processes the data frame; and
determine a latency of the data frame based on a difference between the second timestamp value and the first timestamp value.

10. The circuit of claim 8, further configured to shift the CRC value based om data from the checksum to the end of the data frame.

11. The circuit of claim 8, wherein the first portion is located within a threshold distance of middle of the data frame and the second portion is located at end of the data frame.

12. The circuit of claim 8, wherein the data frame is an Ethernet packet and wherein the modified data frame is used by an Ethernet transactor for performance verification of the data frame.

13. The circuit of claim 8, wherein correcting the checksum value and determining a final CRC value by combining the CRC value with the CRC correction value comprises calculating an XOR of the CRC value and the CRC correction value.

14. The circuit of claim 8, further configured to: responsive to generating a carry value while determining the modified checksum value, add the carry value to the modified checksum value being determined.

15. A system comprising:
a memory storing instructions; and
a computer processor, coupled with the memory and to execute the instructions, the instructions when executed cause the computer processor to:
receive from a software component of a transactor, a data frame including a first portion for storing a checksum value and a second portion for storing a timestamp value, wherein the second portion of data frame is set to zero;
receive a timestamp value for including in second portion of the data frame;
determine a modified checksum value based on the checksum value included in the first portion of the data frame and the timestamp value;
determine a cyclic redundancy check (CRC) value for the data frame by nullifying the checksum value in the data frame and including the timestamp value;
determine a final CRC value by combining the CRC value for the data frame and a CRC correction value based on the checksum value; and
send a modified data frame to a hardware component of the transactor including the modified checksum value and the final CRC value.

16. The system of claim 15, wherein the modified data frame is processed by a design under test, wherein the timestamp value is a first timestamp value, the instructions further causing the processor to:
determine a second timestamp value after the design under test processes the data frame; and
determine a latency of the data frame based on a difference between the second timestamp value and the first timestamp value.

17. A system of claim 15, wherein instructions for determining a final CRC value cause the processor to:
shifting the CRC value based om data from the checksum to the end of the data frame.

18. The system of claim 15, wherein the first portion is located within a threshold distance of middle of the data frame and the second portion is located at end of the data frame.

19. The system of claim 15, wherein the data frame is an Ethernet packet and wherein the modified data frame is used by an Ethernet transactor for performance verification of the data frame.

20. The system of claim 15, wherein correcting the checksum value and determining a final CRC value by combining the CRC value with the CRC correction value comprises calculating an XOR of the CRC value and the CRC correction value.

* * * * *